United States Patent [19]
Kurita et al.

[11] 3,952,254
[45] Apr. 20, 1976

[54] TIMING SIGNAL REGENERATING CIRCUIT

[75] Inventors: Hidehiko Kurita; Tokutaka Nakano, both of Kawasaki; Kenji Mizui, Yokohama, all of Japan

[73] Assignee: Fujitsu Ltd., Kawasaki, Japan

[22] Filed: Dec. 23, 1974

[21] Appl. No.: 536,930

[30] Foreign Application Priority Data
Dec. 30, 1973 Japan.................................. 49-1036

[52] U.S. Cl.................... 328/63; 307/208; 307/269; 328/164; 178/69.5 R
[51] Int. Cl.²...................... H03K 1/17; H03K 5/13
[58] Field of Search ............. 307/208, 269; 328/63, 328/72, 164; 178/69.5 R

[56] References Cited
UNITED STATES PATENTS

| | | | |
|---|---|---|---|
| 3,518,456 | 6/1970 | Mauduit et al. | 307/269 |
| 3,671,873 | 6/1972 | Haas et al. | 328/63 |
| 3,745,248 | 7/1973 | Gibson | 328/63 |
| 3,894,246 | 7/1975 | Torgrim | 307/269 |

Primary Examiner—Stanley D. Miller, Jr.
Attorney, Agent, or Firm—Daniel Jay Tick

[57] ABSTRACT

The resultant sum value of the output signal of the counter of a timing signal regenerating circuit is provided at the point at which rising and falling edges of a two level received signal cross a threshold level. The resultant sum is utilized to slice the received signal and thereby controls the counting operation of the counter in accordance with the resultant sum concerned. The signals are thus shifted into phase, even if there is a variation of the threshold level.

6 Claims, 90 Drawing Figures

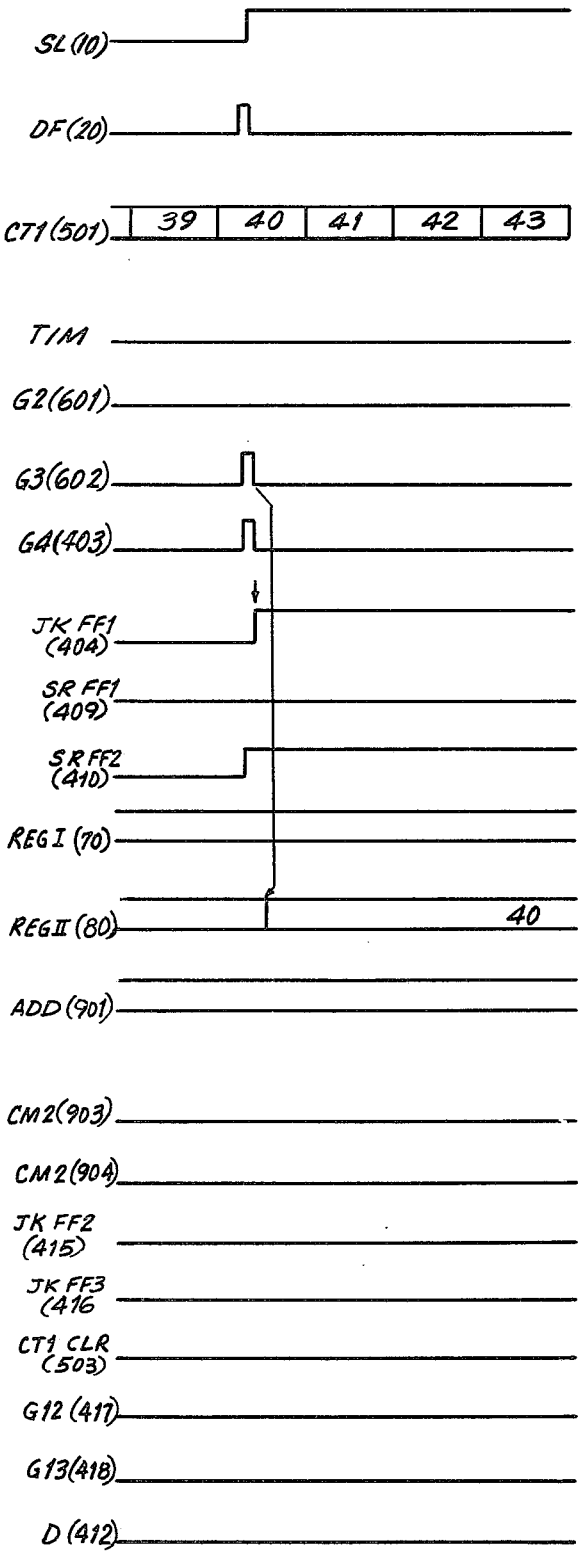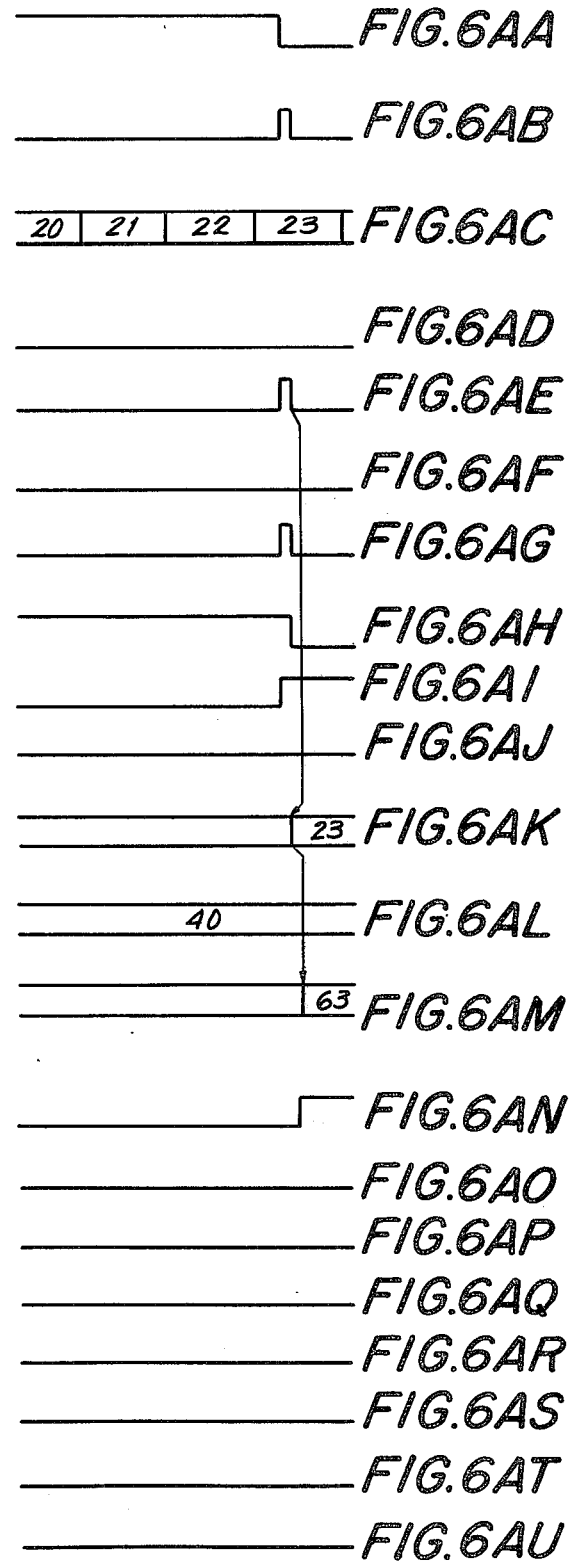

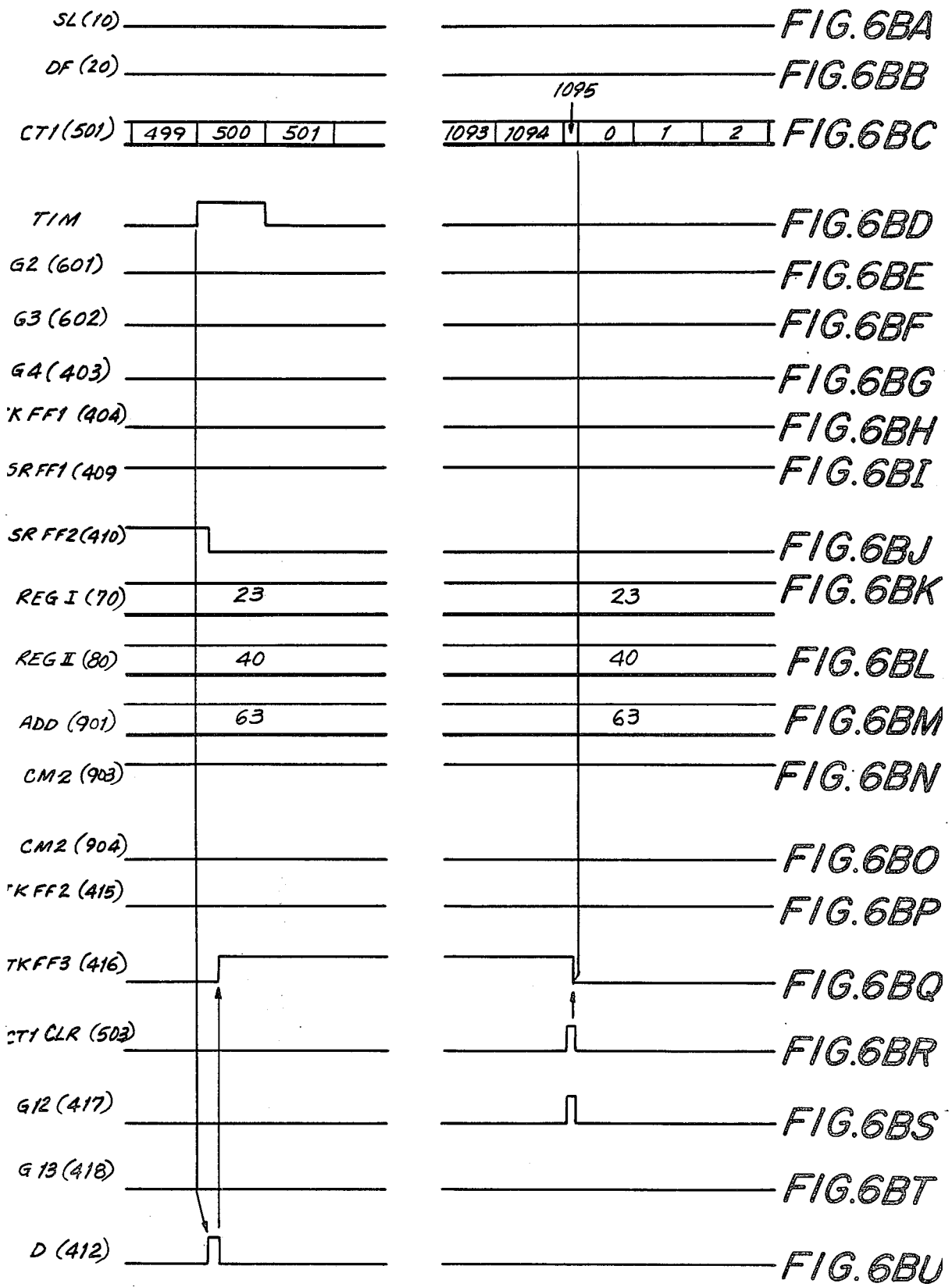

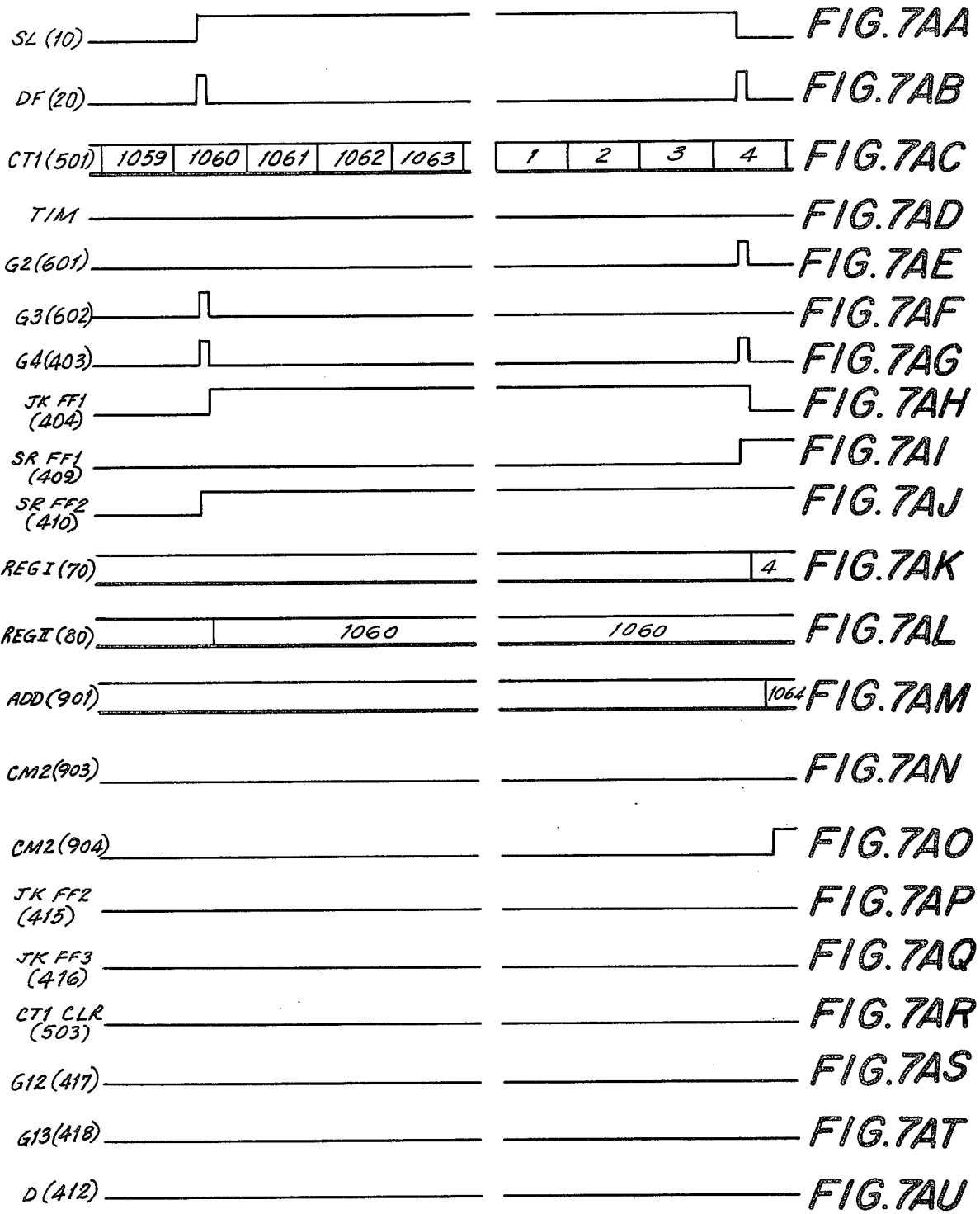

| Signal | Left trace | Right trace | Figure |
|---|---|---|---|
| SL (10) | | | FIG.7BA |
| DF (20) | | | FIG.7BB |
| CT1 (501) | 499 \| 500 \| 501 | 1095 \| 1096 \| 0 \| 1 (1097) | FIG.7BC |
| TIM | pulse | | FIG.7BD |
| G2 (601) | | | FIG.7BE |
| G3 (602) | | | FIG.7BF |
| G4 (403) | | | FIG.7BG |
| JKFF1 (404) | | | FIG.7BH |
| SRFF1 (409) | | | FIG.7BI |
| SRFF2 (410) | step down | | FIG.7BJ |
| REGI (70) | 4 | 4 | FIG.7BK |
| REGII (80) | 1060 | 1060 | FIG.7BL |
| ADD (901) | 1064 | 1064 | FIG.7BM |
| CM2 (903) | | | FIG.7BN |
| CM2 (904) | | | FIG.7BO |
| JKFF2 (415) | step up | | FIG.7BP |
| JKFF3 (416) | | | FIG.7BQ |
| CT1 CLR (503) | | pulse | FIG.7BR |
| G12 (417) | | | FIG.7BS |
| G13 (418) | | | FIG.7BT |
| D (412) | pulse | | FIG.7BU |

PHASE COMPARATOR

TIMING SIGNAL REGENERATING CIRCUIT

Background of the Invention

The present invention relates to a timing signal regenerating circuit. More particularly, the invention relates to a timing signal regenerating circuit which regenerates a timing signal from a two level signal.

In data transmission, a timing signal is required for proper timing to separate certain data signals from the next-succeeding data signals.

In a currently well known timing signal regenerating circuit for a two level received signal, the point at which the rising or falling edge of the two level received signal crosses a threshold level is provided for slicing the received signal. A counter, which counts clock pulses, is controlled in its counting operation in accordance with the substantial phase difference between the cros point and the counted output of the counter. The output signal of the counter thus functions as the timing signal for regenerating the received signal.

The present invention relates to a circuit for regenerating a timing signal at the receiver. In a transmission system utilizing the circuit of the invention, the pilot signal is provided by two level amplitude modulation by the timing signal and is transmitted in addition to the data signals at the transmitter. The pilot signal is received at the receiver and the timing signal is regenerated therefrom.

The cross point of the threshold level and the received signal is provided by slicing the received signal at an appropriate threshold level. The phase lock loop is controlled by the threshold level, and the timing signal is regenerated as a result. However, if the threshold level varies due to temperature variations and aging characteristics of the system, the aforedescribed cross point also varies, resulting in a virtual phase variation. This virtual phase variation may be regarded occasionally as a real phase variation. There has thus long been a strong need for the development of a timing signal regenerating circuit which does not cause virtual phase variation due to variation of the threshold level.

The principal object of the invention is to provide a timing signal regenerating circuit in which threshold level variation does not result in phase variation.

An object of the invention is to provide a timing signal regenerating circuit of simple structure, which is efficiently, in manufacture and functions eficiently, effectively and reliably in providing proper timing of the regenerated timing signal.

Another object of the invention is to provide a timing signal regenerating circuit which is inexpensive in manufacture and overcomes the disadvantage of the known circuit by maintaining correct synchronization without requiring particularly high accuracy even if the received signal level or the threshold level of the slicer vary when the timing signal is extracted by slicing the received signal and jitter of the input changing point signal is suppressed.

BRIEF SUMMARY OF THE INVENTION

The timing signal regenerating circuit of the present invention provides the point at which the rising and falling edges of a two level received signal crosses the threshold level. This is used to slice the received signal. The output signal of a counter, which counts clock pulses, is used as a timing signal for regenerating the received signal by controlling the counting operation of the counter in accordance with the cross point and the count output of the counter. The counting operation of the counter is controlled in accordance with the resultant sum value of the output signal of the counter at the point at which the rising and falling edges of the received signal cross a threshold level.

In accordance with the invention, a timing signal regenerating circuit, including changing point signal generating means for generating a changing point signal at the cross point of a two level received signal and a predetermined signal level, comprises input means for supplying a received signal to the changing point signal generating means. Counting means counts a predetermined number of clock pulses to provide a regenerated timing signal output. First and second storage means are coupled to the changing point signal generating means and the counting means for alternately storing values counted by the counting means at the time that the changing point signal is generated. Adding means is connected to the first and second storage means for adding the counted values stored by the first and second storage means and providing a resultant sum. Control means is connected between the adding means and the counting means for controlling the counting means to control the output timing of the regenerated timing signal in accordance with the resultant sum.

The changing point signal generating means comprises a slicer circuit connected to the input means for slicing the received signal and a differentiation circuit connected to the slicer circuit for differentiating the sliced signal.

The counting means comprises a source of clock signals and a counter connected to and driven by the source of clock signals, said counter provides the regenerated timing signal output when it counts the predetermined number of clock pulses.

The adding and control means include a comparator having an input connected to the output of the adding means and first and second outputs, a first flip-flop circuit connected to the first output and a second flip-flop circuit connected to the second output. The first and second flip-flop circuits have outputs connected to the counting means. The comparator provides a signal at its first output when the resultant sum supplied thereto from the adding means is in a first predetermined range of values and provides a signal at its second output when the resultant sum supplied thereto from the adding means is in a second predetermined range of values, whereby the output timing of the regenerated timing signal is controlled by controlling the output signal condition of the flip-flop circuits.

The counting means has a count value output. A phase comparator has an input connected to the count value output of the counting means, a first output connected to the storage means, and a second output connected to the control means. The phase comparator provides a signal at its first output when the input value is in a predetermined range of values and providing a signal at its second output when the input value is outside the predetermined range of values.

An AND gate has an input connected to the second output of the phase comparator, another input connected to the changing point signal generating means for receiving the changing point signal from the changing point signal generating means and an output. Synchronization protecting means has an input connected to the output of the AND gate and an output connected to the counting means. The synchronization protecting means provides an output signal when an input is supplied continuously for a predetermined number of times and forcibly resets the counting means to zero by supplying the output signal thereto.

BRIEF DESCRIPTION OF THE DRAWINGS

In order that the invention may be readily carried into effect, it will now be described with reference to the accompanying drawings, wherein:

FIGS. 6AA to 6AU, 6BA to 6BU, 7AA to 7AU and 7BA to 7BU are graphical presentations of waveforms appearing at different points of the timing signal regenerating circuit of FIG. 4 and explain the operation of such circuit.

In the FIGS., the same components are identified by the same reference numerals.

DETAILED DESCRIPTION OF THE INVENTION

The timing signal regenerating circuit of the invention provides the timing between a certain data signal and the next-succeeding data signal in a data transmission system. In a data transmission system utilizing the circuit of the invention, the pilot signal is transmitted from the transmitter in a frequency band different from that of the data signal. The pilot signal is provided by two level amplitude modulation by the timing signal. The pilot signal is received at the receiver and the timing signal is regenerated therefrom.

In a basic method of regenerating the timing signal, the received signal is once sliced at the appropriate threshold level at the receiver in order to obtain the cross point of the received signal and the threshold level. The timing signal may thus be obtained by controlling the phase lock loop with the aforedescribed information.

Figure 1:
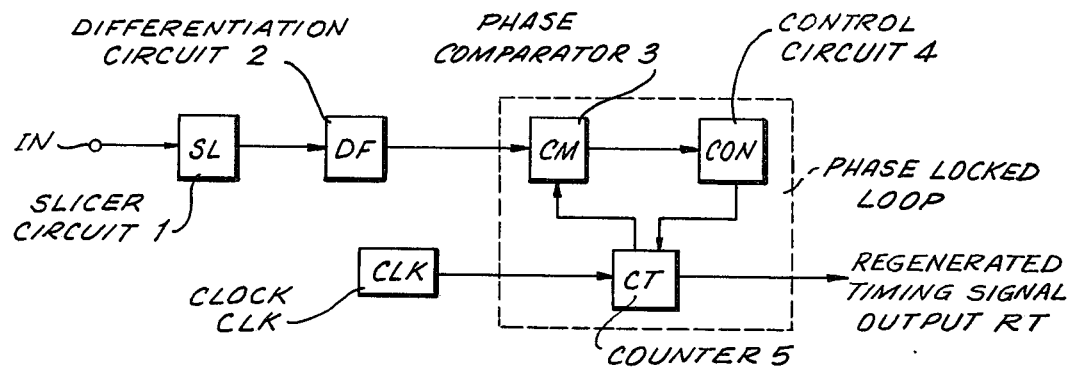
FIG. 1 is a block diagram of a known timing signal regenerating circuit.

FIG. 1 is a block diagram of a known timing signal regenerating circuit. In FIG. 1, the pilot signal is provided via an input terminal IN. The pilot signal is received by the signal regenerating circuit and said received signal is sliced at the appropriate threshold level in a slicer 1. The sliced signal is checked by a differentiation circuit 2 for its rising or falling points, which is the cross point of the received signal and the threshold level. The differentiation circuit 2 supplies the detected signal of the rising or falling point to a phase comparator circuit 3. Each of the slicer circuit 1, differentiation circuit 2 and phase comparator 3 may comprise any suitable known circuit.

An output of a counter 5 of any suitable known type is connected to the phase comparator circuit 3 and the output of the counter 5 is supplied at the same time as the output of the differentiation circuit 2. The phase comparator 3 thus detects the phase difference between the outputs of the differentiation circuit 2 and the counter 5.

A control circuit 4 of any suitable known type controls the counter 5 in accordance with the output of the phase comparator 3 and expands the period of a regenerated timing signal output RT. If this operation is considered from the viewpoint of the method of control by controlling the combination of a clock source CLK of any suitable known type and the counter 5, the value reset to the maximum count value of the counter, that is, reset to zero, is controlled. The clock source CLK drives the counter 5. In the circuit of FIG. 1, however, the phase virtually changes due to variation of the threshold level. The virtual phase variation may be considered to be the actual or real phase variation.

Figure 3:
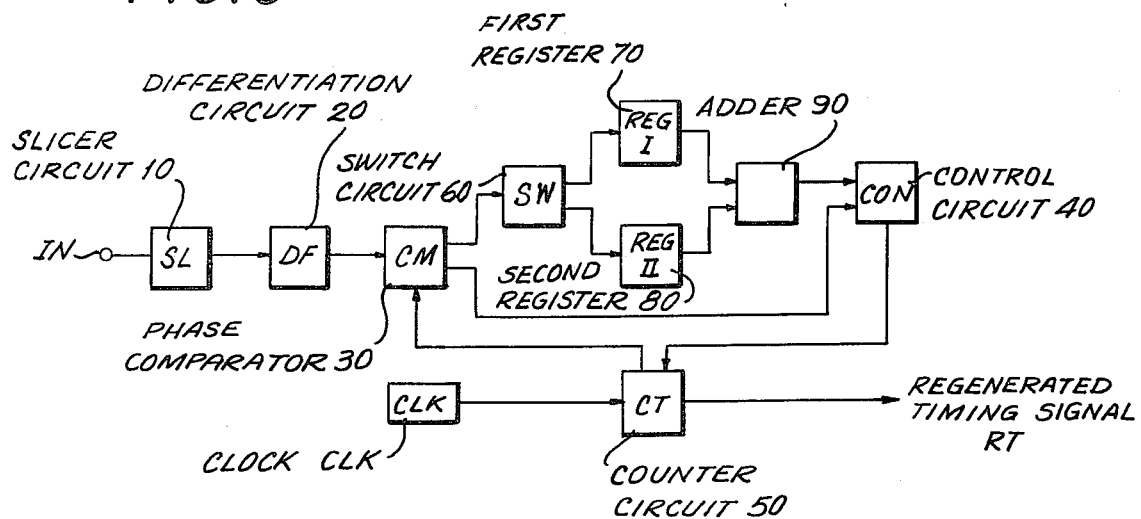
FIG. 3 is a block diagram of an embodiment of the timing signal regenerating circuit of the invention.

In FIG. 3, the phase locked loop is enclosed by broken lines.

Figure 2:
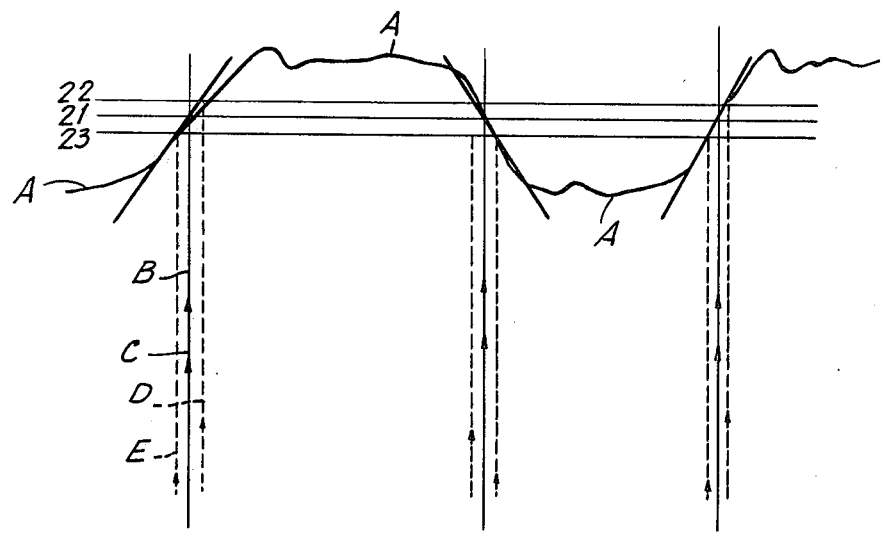
FIG. 2 is a graphical presentation of a received signal waveform, explaining the effect of threshold level variation.

FIG. 2 shows a received signal waveform and explains the effect of variation of the threshold level or slice level.

In general, the received signal is somewhat distorted, as shown in the waveform A of FIG. P2, because of the band limitation. Therefore, when the timing information is derived by slicing the received signal, if the relative threshold level varies with fluctuation or variation of the signal level or the threshold level of the slicer circuit 1, the phase of the output signal of the differentiation circuit 2 of FIG. 1, that is, the phase of the information at the fluctuating point, may shift. For this reason, if a signal corresponding to either the rising or falling point of the waveform is used as the information of the changing point, the phase of the timing information may shift.

The waveform A of FIG. 2 is the waveform of the received signal and 21, 22 and 23 are the slice levels in FIG. 2. The level 21 is the reference level, and the levels 22 and 23 are the upper and lower levels, respectively. In FIG. 2, B is the information at the changing point or the output of the differentiation circuit 2 of FIG. 1 when the slice level 21 is selected. In FIG. 2, C is the regenerated timing signal, that is, the regenerated timing signal output RT of FIG. 1. In FIG. 2, D and E are the information at the changing point when the slice level shifts to 22 and 23, respectively. As shown in FIG. 2, virtual phase shift of the information at the changing point occurs like D and E due to signal level change or fluctuation of the threshold level at the slicer circuit 1 of FIG. 1.

A direct countermeasure for the problem of phase shift is the automatic adjustment of the threshold level. Such adjustment, however, includes the problems of accuracy and pull-in process.

In other words, in order to fix the threshold level at the reference level, a highly accurate compensating circuit is required for the purpose of suppressing the level fluctuation. This results in high costs and is therefore an economic disadvantage.

The timing signal regenerating circuit of the invention solves the aforedescribed disadvantage of the known circuit. The solution of the problem is explained hereinafter with reference to the drawings.

FIG. 3 is a block diagram of an embodiment of the timing signal regenerating circuit of the invention. In FIG. 3, a received input signal is supplied to a signal input terminal IN. The input signal is sliced by a slicer circuit 10. A differentiation circuit 20 detects the information at the level changing point during the rising or falling period of the received signal. A phase comparator 30 compares the phases of the counter output of a counter circuit 50 provided at the output times of the changing point information and at the times of the information of the changing point.

The degree of the phase shift determines the necessity for control by a control circuit 40. In other words, if the phase shift exceeds a predetermined range, the counter circuit 50 is not controlled. If the phase shift is in the predetermined range, the counter circuit is controlled. This point is explained hereinafter in greater detail. When the phase shift is in a predetermined range, the count value of the counter 50 at the output time of the changing point information is stores in a first register 70 and the count value of the counter at the output time of the next changing point information is stored in a second register 80.

A switching circuit 60 alternately switches the count value of the counter 50 at the rising or falling point of the received signal to the first and second registers 70 and 80. The counted or count values stored in the first and second registers 70 and 80 are added by an adder 90 to provide a resultant sum. The resultant sum is supplied to the control circuit 40 to control the counter 50.

A clock source CLK drives the counter or counter circuit 50.

The regenerated timing signal RT is provided at an output of the counter 50.

Each of the slicer circuit 10, the differentiation circuit 20, the phase comparator 30, the control circuit 40, the counter circuit 50, the switch circuit 60, the registers 70 and 80, the adder 90 and the clock source CLK comprises any suitable known circuit for accomplishing the desired function.

Figure 4:
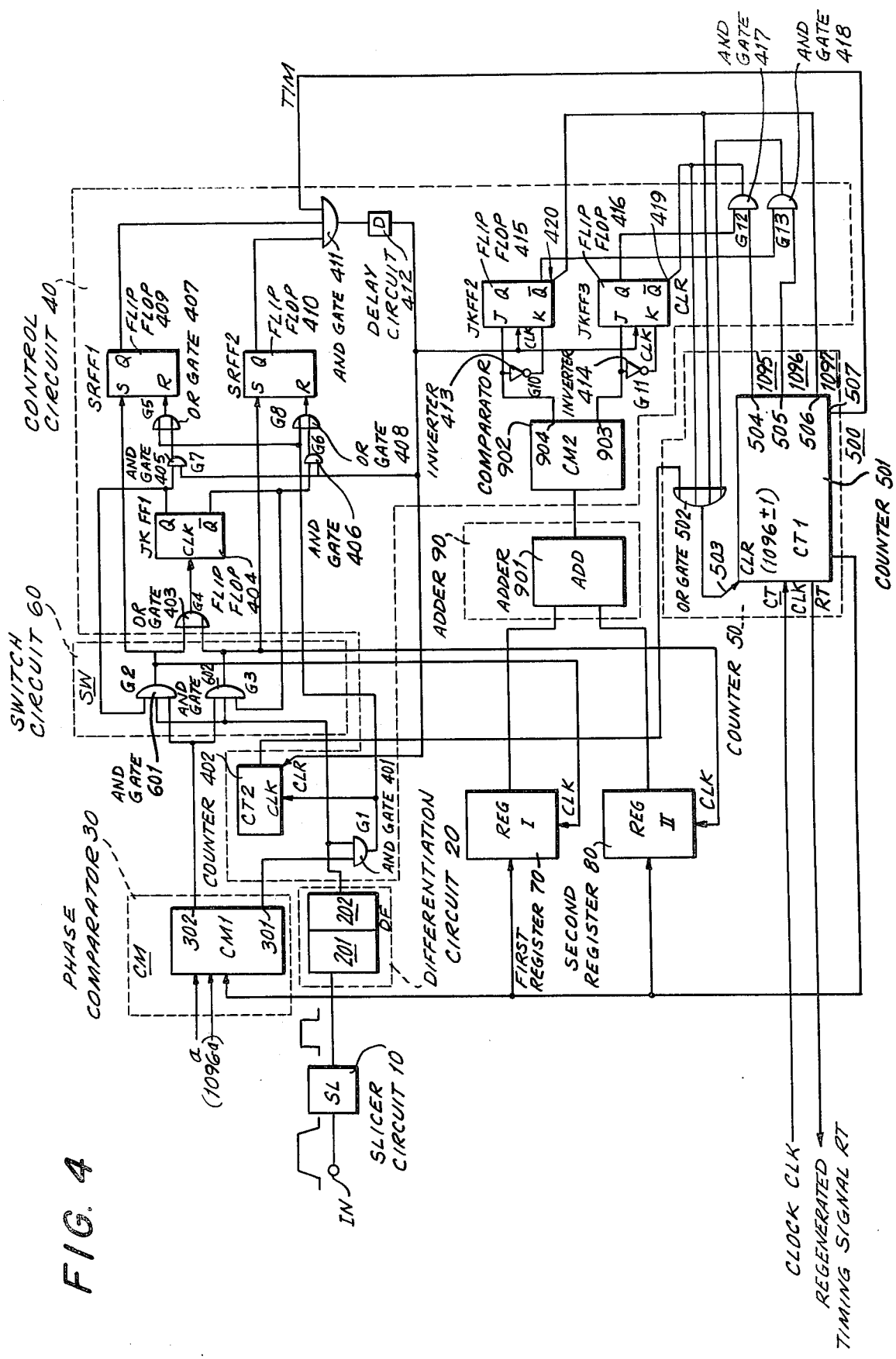
FIG. 4 is a more detailed block diagram of the embodiment of FIG. 3.

FIG. 4 is a more detailed diagram of the embodiment of FIG. 3 of the timing signal regenerating circuit of the invention. In FIG. 4, the received signal supplied to the input terminal IN is sliced at almost the center of the rising and falling period, as shown in FIG. 2, by the slicer circuit 10. The output from the slicer circuit 10 is then supplied to the differentiation circuit 20, which comprises a differentiator 201 and a rectifier 202. The waveform differentiated by the differentiator 201 is full-wave rectified by the rectifier 202.

The count or counted value or count output of a counter 501 of the counter circuit 50 is always supplied to the phase comparator 30. The counted value A of the counter 501 is compared with the value $(1096 - a)$ and $a$. Then, when $0 \leq A \leq a$ or $(1096 - a) \leq A \leq 1096$, an output signal is provided at a terminal 302 of the comparator 30. When $a < A < 1096$, an output signal is provided at the terminal 301 of the comparator. Here, the counted value 1096 is the reference value for the disclosed embodiment of the invention and $a$ is the value determined for judging whether or not the counted value of the counter 501 is to be controlled. Thus, for example, $a$ is an integer, such as 128. In the disclosed embodiment, $a$ is determined as 128.

The process of the locked phase is explained, as follows. In the embodiment of FIG. 4, the counter 501 is controlled when $0 \leq A \leq a$ or $(1096 - a) \leq A \leq 1096$, and is not controlled, since the phase shifts greatly when $a < A < 1096$. During the process of phase locking, if the counted value A of the counter 501 may be assumed to be within the range of $a < A < 1096$, the output of the comparator 30 is provided at the terminal 301. Therefore, the output at the terminal 301 of the comparator 30 and the output of the differentiation circuit 20 are supplied to corresponding inputs of an AND gate 401. The AND gate 401 thus provides an output signal. The output of the AND gate 401 is supplied to a counter 402 and to the reset terminals of set-reset flip-flop circuits 409 and 410. The counter 402 functions as a synchronization protection circuit.

The counter 402 is set to provide an output pulse when counting is performed continuously for four steps. Therefore, when the AND gate 401 provides an output signal 4 times in succession, the signal output of the counter 402 is supplied to a terminal 503 of the counter 501 via an OR gate 502. At such time, the counter 501 is forcibly cleared, reset to zero, and thus the phase locking process ends.

In the embodiment of FIG. 4, it is assumed that an output signal is provided when the counter 402 counts 4. However, the count is not limited to 4 counts, and may be determined freely from the point of view of protecting synchronization.

The operation for normal control with the count value A of the counter 501 within the range of $(1096 - a) \leq A \leq 1096$ and $0 \leq A \leq a$, is hereinafter described.

As hereinbefore mentioned, in this case, the counter operation is controlled and the count value is adjusted for output at the correct timing, by determining the phase of the regenerated timing signal RT produced as the counter output to be leading or lagging the received signal.

Figure 5:
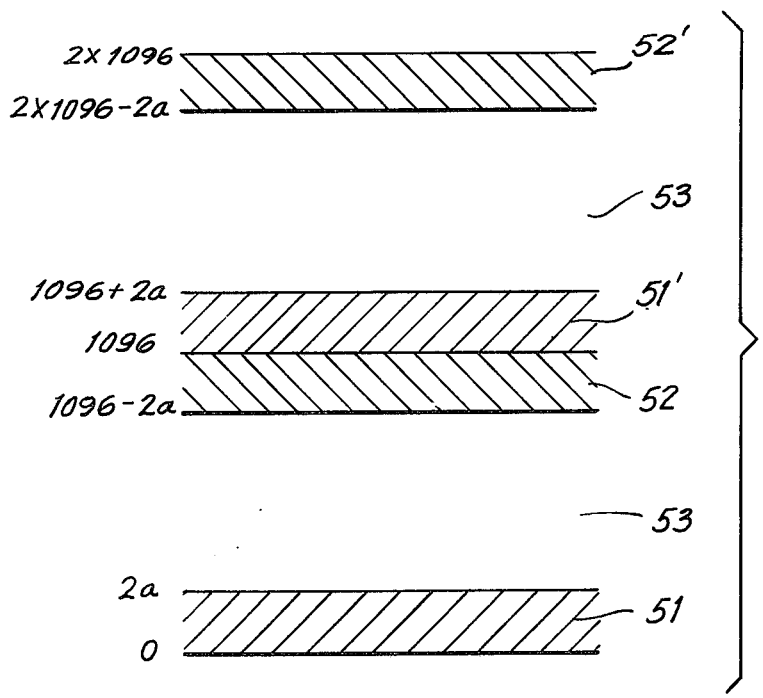
FIG. 5 is a graphical presentation explaining the determination of the lead and lag of a regenerated timing signal.

The determination of the lead and lag of the counter is hereinafter explained by FIG. 5. In FIG. 5, the value at the left is the sum of the counting value of the counter 501 when the adjacent differentiation circuit or the adder 901 produces an output. The ranges 51 and 51' are those for counting 1095. The ranges 52 and 52' are those for counting 1097. The range 53 is, in the embodiment of FIG. 4, such that if the resultant count is in this range 4 times in succession, the circuit is considered to be out of synchronism.

In other words, when the resultant count of the counter 501 at the two changing points is in the range 51 or 51', the counting value of said counter is relatively lagging. Therefore, 1095 is counted. If the resultant count of the counter 501 is in the range 52 or 52', the count value of said counter 501 is leading, requiring the counting of 1097. The control is thus performed so that the counting value of the counter 501 comes near to zero or 1096. The values of the ranges 51, 51', 52, 52' and 53 are shown in the following table, as an example.

Table I

| RANGE | VALUE OF SECOND REGISTER 80 | VALUE OF FIRST REGISTER 70 | VALUE OF ADDER 901 |
| --- | --- | --- | --- |
| 51 | 40 | 23 | 63 |
| 51' | 1095 | 10 | 2005 |
| 52 | 1060 | 4 | 1064 |
| 52' | 1094 | 1094 | 2188 |
| 53 | 500 | 510 | 1010 |

In Table I, the value of the adder 901 corresponding to the range 53 corresponds to the range 52. At such time, however, since the output of the comparator 30 is provided at the terminal 301 thereof when the register 70 or 80 has a value 500 or 510, the counter 402 is required to count up. The foregoing value is thus considered to correspond to the range 53.

The actual control operation at the time that the values shown in Table I are taken is explained with reference to FIGS. 4, 6AA to 6AU and 6BA to 6BU. The symbols shown in the time charts of FIGS. 6AA to 6AU and 6BA to 6BU correspond to those of FIG. 4. The time chart of FIGS. 6AA to 6AU shows the operations of the count value of counter 501 being read into the first and second registers 70 and 80 and such count value being added by the adder 901. The time chart of FIGS. 6BA to 6BU shows the operations of the count value of the counter 501 being actually controlled during the counting period succeeding that shown in FIGS. 6AA to 6AU.

The explanation of the counting value of the range 51 in Table I utilizes FIGS. 6AA to 6AU and 6BA to 6BU. When FIGS. 6AA to 6AU are considered, the threshold level is relatively raised, as shown in D in FIG. 2.

The received signal supplied to the input terminal IN is sliced by the slicer circuit 10. The sliced signal is differentiated by the differentiation circuit 20. The first differentiated output is supplied to AND gates 601 or G2 and 602 or G3. At such time, since the output of the comparator 30 is provided at the terminal 302 thereof, both the diferentiated output and the output from the comparator 30 are supplied to the AND gates 601 and 602. The output condition of a JK flip-flop 404, coupled to the outputs of the AND gates 601 and 602 via an OR gate 403 or G4, is assumed to be $\overline{Q}$. The AND gate 602 or G3 provides an output signal which is supplied to the second register 80, while the counting value 40 of the counter 501 is read into said register. At the same time, a set-reset flip-flop 410 is set. Furthermore, the JK flip-flop 404 changes its output condition from $\overline{Q}$ to Q via the OR gate 403.

One output of the flip-flop 404 of the control circuit 40 is coupled to the reset input of a set-reset flip-flop 409 via an AND gate 405 or G7 and an OR gate 407 or G5. The output of the AND gate 601 is connected to the set input of the flip-flop 409. The output of the AND gate 602 is connected to the set input of the flip-flop 410. The other output of the flip-flop 404 is coupled to the reset input of the set-reset flip-flop 410 via an AND gate 406 or G6 and an OR gate 408 or G8.

When the second differentiated output is provided, it is provided by the AND gate 601 in the same manner as aforedescribed. At such time, the count value 23 of the counter 501 is read into the first register 70. At the same time, the flip-flop 404 changes its output condition from Q to $\overline{Q}$ via the OR gate 403. In addition, the flip-flop 409 is set by the output provided by the AND gate 601. The counter values read into the registers 70 and 80 are added by the adder 901. The resultant sum at such time becomes 63, which is 40 + 23, in this case. The output from the adder 901 is then supplied to a comparator 902. The comparator 902 determines which of the ranges 51, 51', 52, 52' and 53, shown in FIG. 5, the resultant sum is in.

If the resultant sum is in the range 51 and 51', the comparator 902 provides an output at a terminal 903 thereof. If the resultant sum is in the range 52 and 52', the comparator 902 provides an output at a terminal 904 thereof. Then, since the resultant sum 63 is included in the range 51, the output of the comparator 902 is provided at the terminal 903. The output of the comparator 902 is supplied to a JK flip-flop 416, the output condition of which is assumed to be $\overline{Q}$.

The actual control operation for the counting value of the counter 501 is explained hereinafter with reference to FIGS. 6BA to 6BU. It is supposed that the outputs of both the set-reset flip-flops 409 and 410 are in the output condition Q and that such outputs are supplied to inputs of an AND gate 411 or G9. In FIG. 4, when the count value is 500 and an output is supplied from the counter 501 to the AND gate 411, the signal is provided by said AND gate and is fed to the flip-flops 415 and 416 as a clock signal via a delay circuit 412. As hereinbefore mentioned, since the signal is supplied to the flip-flop 416 from the terminal 903 of the comparator 902, said flip-flop 416 changes its output condition from $\overline{Q}$ to Q by means of the clock signal.

At such time, the counter 501 is set so that it provides an output at its terminal 504 when 1095 is counted, provides an output at its terminal 505 when 1096 is counted, provides an output at its terminal 506 when 1097 is counted, and provides an output at its terminal 507 when 500 is counted. Since the output from the flip-flop 416 is supplied to an input of an AND gate 417 or G12, said AND gate provides an output signal from the terminal 504 of the counter 501 when said counter counts 1095, satisfying the AND conditions. The output signal of the AND gaate 417 is supplied to the terminal 503 of the counter 501 via an OR gate 502, thereby clearing said counter. At such time, the counter 501 provides the regenerated timing signal RT as an output.

Simultaneously, the output of the AND gate 417 is supplied to the terminal 419 of the flip-flop 416, thereby changing the output condition of said flip-flop to $\overline{Q}$.

As hereinbefore mentioned, when the value of the output from the adder 901 is in the range 51, the counter 501 is controlled so that the counting value of said counter approaches zero or 1096 by counting 1095.

Furthermore, when the value of the output of the adder 901 is in the range of 51', since the counting value of the counter 501 is lagging relative to the received signal, the counter is also controlled so that the counting value of said counter approaches zero or 1096 in the same manner as hereinbefore mentioned by counting 1095.

The counting value included in the range 52 of Table I is explained as follows: In such case, the threshold level E, shown in FIG. 2, is lower than the reference level. The operation is explained with reference to the time charts of FIGS. 7AA to 7AU and 7BA to 7BU.

FIGS. 7AA to 7AU are a time chart of a series of operations wherein the count value of the counter 501 is read into the registers 70 and 80, and the count value is added to the adder 901. FIGS. 7BA to 7BU are also a time chart of a series of operations wherein the count value of the counter 501 is actually controlled during the counting period next-succeeding that shown in FIGS. 7AA to 7AU.

The circuit operation in the time chart of FIGS. 7AA to 7AU is exactly the same as that in the time chart of FIGS. 6AA to 6AU hereinbefore mentioned. In FIGS. 7AA to 7AU, however, the counting values to be read into the registers 70 and 80 are 4 and 1060, respectively. The count values read into the registers 70 and 80 are added at the adder 901. The resultant sum thus becomes 1064, which is 4 + 1060. The resultant sum is then supplied to the comparator 902 as the output from the adder 901. The comparator 902 determines in which range of the ranges 51, 51', 52, 52' and 53, as shown in FIG. 5, the resultant sum is. In this case, since the resultant sum is in the range 52, the comparator 902 provides an output signal at the terminal 904. The signal at the terminal 904 of the comparator 902 is supplied to the flip-flop 415. Prior to the supply of the signal, the output condition of the flip-flop 415 is $\overline{Q}$.

The control of the counting value of the counter 501 is hereinafter explained with reference to FIGS. 7BA to 7BU.

The output conditions of both flip-flops 409 and 410 is presumed to be Q and the outputs of said flip-flops are supplied to the AND gate 411. In the embodiment of FIG. 4, when the output from the counter 501 is supplied to the AND gate 411 while the counting value is 500, the AND gate 411 provides an output signal, which is fed to the flip-flops 415 and 416 as the clock signal via the delay circuit 412. Since a signal is supplied to the flip-flop 415 from the terminal 904 of the comparator 902, the output condition of said flip-flop is changed from $\overline{Q}$ to Q by the clock signal.

At such time, the output condition of the flip-flop 415 is $\overline{Q}$. Thus, neither of the AND gates 417 and 418 provides an output signal. The counter 501 thus counts up to 1097, and at such time the count value of 1097 is supplied to the terminal 503 of the counter 501 via the OR gate 502, thereby clearing the counter 501. At the same time, the counter 501 provides an output of the regenerated timing signal RT. The counting value of 1097 when the counter 501 counts up to 1097 is supplied to a terminal 420 of the flip-flop 415. This changes the output condition of the flip-flop 415 to $\overline{Q}$.

As hereinbefore explained, when the output value of the adder 901 is in the range 52, the counter is controlled so that the counting value of said counter reaches zero or approaches 1096 by counting up to 1097.

Furthermore, if the output value of the adder 901 is in the range 52', the counter 501 is controlled in a manner similar to the aforedescribed manner, so that the counting value of the counter 501 becomes zero or approaches 1096 by counting 1097, since the counter value of said counter 501 relatively leads the received signal.

Both flip-flops 409 and 410 of the control circuit 40 are in set condition and they clear the counter 402 at the time that the counter 501 counts 500. In other words, both flip-flops 409 and 410 are set and the counter 402 is cleared by the output from the AND gate 411 when the output from the counter 501 is supplied to said AND gate 411. Thus, when the counting value of the counter 501 enters the control range 2 times in succession, the counter 402 is cleared. Therefore, in the circuit of the invention, the counter 402 does not provide an output unless counting is performed 4 times in succession. That is, the counter 402 functions to protect the synchronization. The counter 402 provides an output when counting is performed 4 times in succession. However, the number of counting times is not limited to 4.

Figure 8:
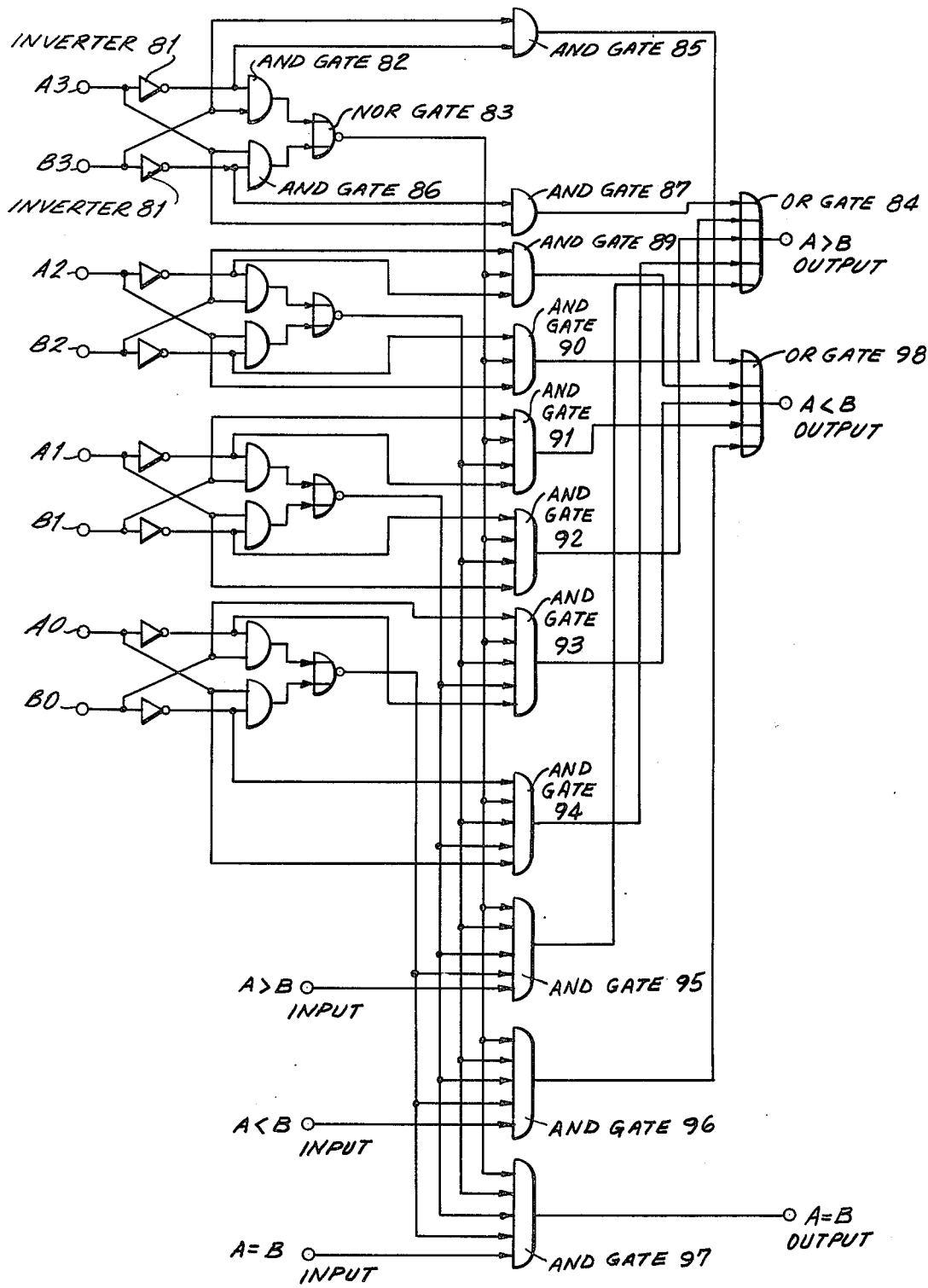
FIG. 8 is a block diagram of an embodiment of the phase comparator 30 of the timing signal regenerating circuit of FIGS. 3 and 4.

FIG. 8 is a block diagram of an embodiment of the comparator 30 of FIGS. 3 and 4. In FIG. 8, the four input stages are essentially identical, so that only the input stage A3, B3 is labelled, and described. The input stage A3, B3 comprises an input terminal A3 connected to an input of an AND gate 82 and to an input of an AND gate 85 via an inverter 81, to an input of an AND gate 86 and to an input of an AND gate 87. An input terminal B3 is connected to an input of the AND gate 86 and to the other input of the AND gate 87 via an inverter 88, to the other input of the AND gate 82 and to the other input of the AND gate 85. The outputs of the AND gates 82 and 86 are connected to inputs of a NOR gate 83. The output of the NOR gate 83 is connected to an input of each of a plurality of AND gates 89, 90, 91, 92, 93, 94, 95, 96 and 97. The output of the AND gate 85 is connected to an input of an OR gate 98. The outputs of the AND gates 87 and 89 to 97 are connected to selected inputs of OR gates 84 and 98.

The numerals A and B are binary numbers and a comparison is made from the upper digits such as A3, B3, A2, B2, and so on. Since the reference counting value in the circuit of the invention is determined as 1096, a total of 11 bits is required when it is expressed as a binary number. Therefore, in the circuit of FIG. 8, a maximum comparison of 4 bits may be made. For this reason, it is necessary to form a circuit for 12 bits by connecting the terminals corresponding to A > B input and A > B output, A < B input and A < B output, and A = B input and A = B output. The circuit of the comarator 902 is identical to that of the comparator 30.

As hereinbefore explained, the circuit of the invention provides a regenerated timing signal by determining the cross point of the received signal and the threshold level during the rising and falling of adjacent two level received signals and by controlling the counting operation of the counter by the resultant sum of the counting values of the counter. The timing signal regenerating circuit of the invention provides an accurate regenerated timing signal without phase error due to fluctuation of threshold levels.

While the invention has been described by means of a specific example and in a specific embodiment, we do not wish to be limited thereto, for obvious modifications will occur to those skilled in the art without departing from the spirit and scope of the invention.

We claim:

1. A timing signal regenerating circuit including changing point signal generating means for generating a changing point signal at the cross point of a two level received signal and a predetermined signal level, said timing signal regenerating circuit comprising
   input means for supplying a received signal to the changing point signal generating means;
   counting means for counting a predetermined number of clock pulses to provide a regenerated timing signal output;
   first and second storage means coupled to the changing point signal generating means and the counting means for alternately storing values counted by the counting means at the time that the changing point signal is generated;
   adding means connected to the first and second storage means for adding the counted values stored by the first and second storage means and providing a resultant sum; and
   control means connected between the adding means and the counting means for controlling the counting means to control the output timing of the regenerated timing signal in accordance with the resultant sum.

2. A timing signal regenerating circuit as claimed in claim 1, wherein the changing point signal generating means comprises a slicer circuit connected to the input means for slicing the received signal and a differentiation circuit connected to the slicer circuit for differentiating the sliced signal.

3. A timing signal regenerating circuit as claimed in claim 1, wherein the counting means comprises a source of clock signals and a counter connected to and driven by the source of clock signals, said counter providing the regenerated timing signal output when it counts the predetermined number of clock pulses.

4. A timing signal regenerating circuit as claimed in claim 1, wherein the adding and control means include a comparator having an input connected to the output of the adding means and first and second outputs, a first flip-flop circuit connected to the first output and a second flip-flop circuit connected to the second output, said first and second flip-flop circuits having outputs connected to the counting means, said comparator providing a signal at its first output when the resultant sum supplied thereto from the adding means is in a first predetermined range of values and providing a signal at its second output when the resultant sum supplied thereto from the adding means is in a second predetermined range of values, whereby the output timing of the regenerated timing signal is controlled by controlling the output signal condition of the flip-flop circuits.

5. A timing signal regenerating circuit as claimed in claim 4, wherein the counting means has a count value output, and further comprising a phase comparator having an input connected to the count value output of the counting means, a first output connected to the storage means, and a second output connected to the control means, said phase comparator providing a signal at its first output when the input value is in a predetermined range of values and providing a signal at its second output when the input value is outside the predetermined range of values.

6. A timing signal regenerating circuit as claimed in claim 5, further comprising an AND gate having an input connected to the second output of the phase comparator, another input connected to the changing point signal generating means for receiving the changing point signal from the changing point signal generating means and an output, and synchronization protecting means having an input connected to the output of the AND gate and an output connected to the counting means, said synchronization protecting means providing an output signal when an input is supplied continuously for a predetermined number of times and forcibly resetting said counting means to zero by supplying the output signal thereto.

* * * * *